United States Patent
Perez Gonzalvo et al.

(10) Patent No.: US 6,244,164 B1
(45) Date of Patent: Jun. 12, 2001

(54) PROCESS AND CORRESPONDING MACHINES FOR THE PREPARATION OF READY-COOKED AND SEMI-COOKED DISHES

(75) Inventors: José Perez Gonzalvo; Adrián Hernandis Marco, both of Albalat de la Ribera (ES)

(73) Assignee: Bonapaella S.L., Albalat de la Ribera (ES)

( * ) Notice: Subject to any disclaimer, the term of this patent is extended or adjusted under 35 U.S.C. 154(b) by 0 days.

(21) Appl. No.: 09/623,069

(22) PCT Filed: Feb. 25, 1999

(86) PCT No.: PCT/ES99/00049

§ 371 Date: Aug. 25, 2000

§ 102(e) Date: Aug. 25, 2000

(87) PCT Pub. No.: WO99/43215

PCT Pub. Date: Sep. 2, 1999

(30) Foreign Application Priority Data

Feb. 26, 1998 (ES) .................................................. 9800411

(51) Int. Cl.⁷ ................................ A23L 1/00; A23L 1/32; A23L 1/182; A47J 37/04
(52) U.S. Cl. ................................ 99/327; 99/332; 99/335; 99/348; 99/352; 99/355; 99/373
(58) Field of Search ............................ 99/325–334, 335, 99/348, 349, 339, 340, 341, 342, 352–355, 356, 359–371, 372–384, 495, 496, 509–511, 516, 517; 426/523

(56) References Cited

U.S. PATENT DOCUMENTS

| | | | | |
|---|---|---|---|---|
| 1,010,887 | * | 12/1911 | French | 99/424 X |
| 2,033,178 | * | 3/1936 | Brand et al. | 99/356 X |
| 3,073,704 | * | 1/1963 | Rivoche | 99/327 X |
| 3,340,793 | * | 9/1967 | Nilsen | 99/423 X |
| 3,753,737 | * | 8/1973 | Latham et al. | 99/373 |

* cited by examiner

*Primary Examiner*—Timothy F. Simone
(74) *Attorney, Agent, or Firm*—Richard M. Goldberg

(57) ABSTRACT

A process for the preparation of ready-cooked and semi-cooked dishes in a cooking container into which are incorporated all the ingredients, preferably automatically, including mixing of the ingredients just as for an artisanal preparation. A machine for performing the process includes a heating surface on which are placed containers for individual use, the surface being driven by a timed driving system, food supply devices which supply the food according to the timing of the driving system, such that the dishes can be consumed, preserved or frozen. It is also possible to interrupt the cooking in order to separate the solids from the liquid which can be preserved or frozen. The final phase can be carried out in a machine which has a resistance and a container support, one or the two being separable from the other after a delay.

19 Claims, 5 Drawing Sheets

PROCESS AND CORRESPONDING MACHINES FOR THE PREPARATION OF READY-COOKED AND SEMI-COOKED DISHES

BACKGROUND OF THE INVENTION

The present invention is directed to a method and corresponding machines for making pre-cooked and semi-pre-cooked meals.

The sector involved in this patent's technique is that of making ready-to-serve food.

Statement of the prior state of the art. The industry making ready-to-serve food is well known and increasingly well-developed. Apart from this the ready-to-serve meals trade is also increasingly well-developed. Both businesses form a partnership in towns and cities to solve the cooking problem at homes at which all the members are at work or otherwise busy.

ES2116236 consists of a procedure for pre-cooking ingredients for a rice patella, in which a conventional pre-cooking process is carried out in a container and the contents and its container are inserted into a bag in which a vacuum is formed. This is sterilised, stored and distributed.

ES2121692 is a process for pre-cooking rice paellas, which, as compared with the one described in the previous case, adds the fact that the paella dish is cooled prior to fully removing its contents, to be inserted in the bar.

ES2096530 is a procedure for preparing pre-cooked paellas, which consists in preparing a lightly-fried base in which to fry the ingredients of the paella except for the rice, which is deep-frozen and supplied in solid form with the contents frozen.

ES2032704 covers a procedure for preparing a rice-based pre-cooked meal, which includes the preparation of the lightly fried base in large quantities and separately frying all the ingredients with parts of said fried base, being deep frozen and served ready to eat except for cooking the rice.

ES2048112 is a procedure for preparing a pre-cooked rice-based meal, which includes a large capacity container in which a lightly fried base is prepared, which is then put into separate smaller pans in which the rest of the food is prepared, and then frozen to be marketed.

ES2035769 covers a procedure for preparing frozen cooked paella, in which a flat container is used to prepare a meal based on rice and water with an oil-fried base, tomato, chicken and rabbit pieces, saffron, salt, greens and optionally snails, in which these items are cooked except for rice, which is added one hour afterwards, later being cooled for 2–4 hours and the container wrapped in shrink-wrap plastic and deep-frozen.

Nevertheless, these are types of pre-cooked food which can only be made by experts, or have been considered as such. This is in particular the problem with paella. The paella, a meal which originated in Valencia and has spread widely all over the world, nevertheless involves the problem of its home-made style of cooking. It is not enough to supply the ingredients, but the way this is cooked has such a great influence on the results that, even with the same content, two dishes can be enormously different if these are made by different cooks. This problem is heightened when this is cooked in so-called industrial containers containing hundreds or thousands of portions. Furthermore the presence of an individual paella, or pan of paella, just as this has been cooked, has a much better appearance than a portion of the same dish served on a plate, since the Valencian tradition is to eat from the paella cooking pan itself without transferring this to an individual plate.

SUMMARY OF THE INVENTION

This invention puts forward a method and corresponding machines for making pre-cooked and semi-pre-cooked meals, whose basic characteristic is to allow the possibility of developing an industry based on producing ready-to-serve meals made one by one in individual portions.

In accordance with a preferential embodiment a method is described for making pre-cooked dishes in a cooking container, in which the respective ingredients are added, preferably automatically, in the pre-set cooking stage, as well as being turned over, to simulate a home-made cooking process.

To make rice paellas, and more specifically the Valencian paella, a lightly fried base has to be made in which certain ingredients are gradually added, depending on how far the cooking process has gone, these ingredients being basically chicken and rabbit, greens and tomato, all of this in an oil base. The method described thus involves automatically turning over the meat and greens, in order to be cooked on both sides for the pre-set times, adding the liquid base for cooking (preferably water, but also stock), also rice, and cooking the rice in the stock produced by the other ingredients.

A second form of embodiment, as compared with the previous method, involves partially cooking the rice, by removing the liquid base, for this to be separately provided so that in the last cooking stage this is again combined in order to be completely cooked with only a few minutes' exposure to a heat source. Said method allows completing the cooking at a time and in a place other than those in which it was prepared, but whilst keeping the characteristics of a "recently made" meal.

According to either of the previous embodiments, the cooked or partially cooked product can be frozen or cooled for its distribution, and heated up or its cooking completed after mixing the solid or liquid parts at the place where this is to be consumed.

Furthermore the machines which carry out this process mean that pre-cooked or semi-pre-cooked paellas can be made profitably, either ready to eat or ready to be finished, without requiring any expertise to do so.

BRIEF DESCRIPTION OF THE DRAWINGS

In order to make the following explanation clearer, five sheets of drawings are enclosed, which represent the essence of this invention in nine figures.

DETAILED DESCRIPTION

Figure 1:
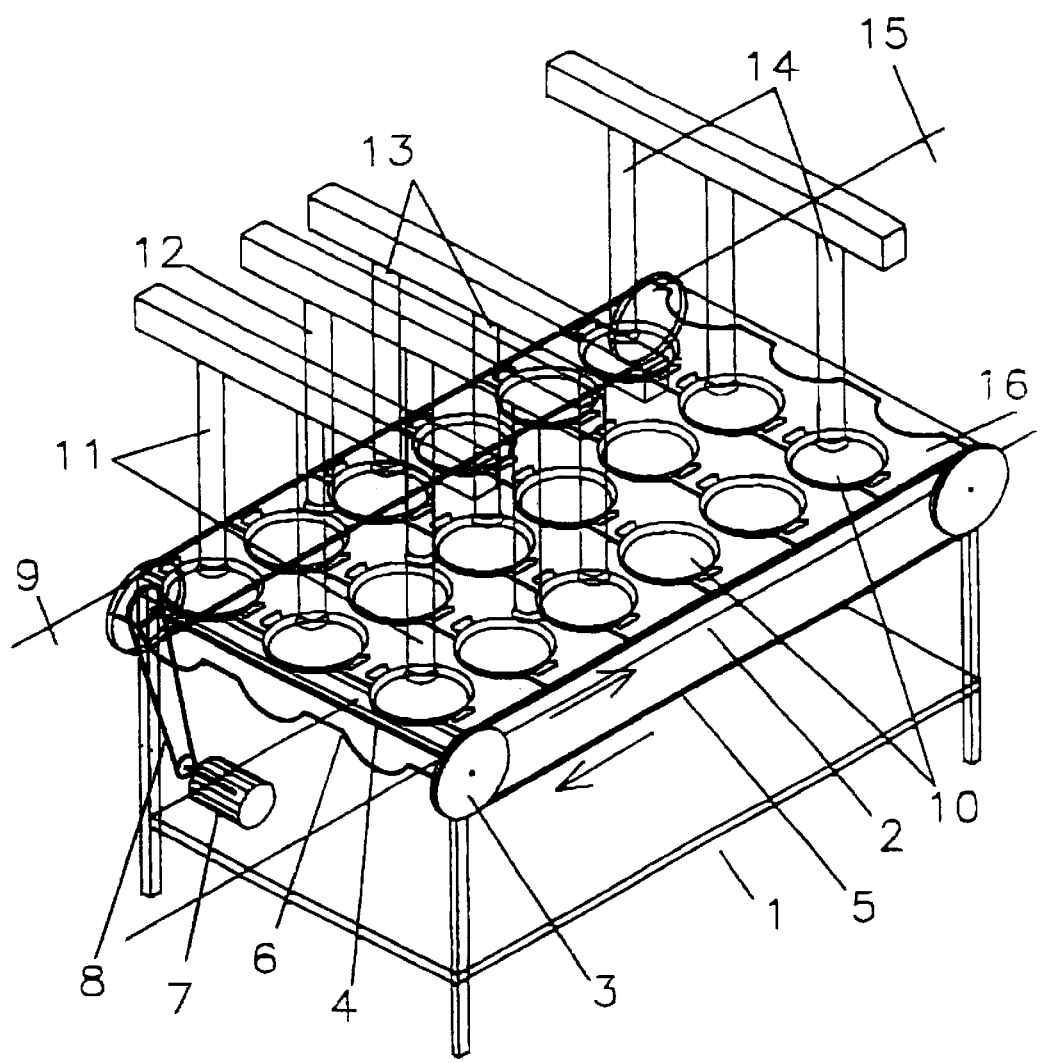
FIG. 1 shows a schematic perspective view of a linear machine for making pre-cooked meals.
Figure 2:
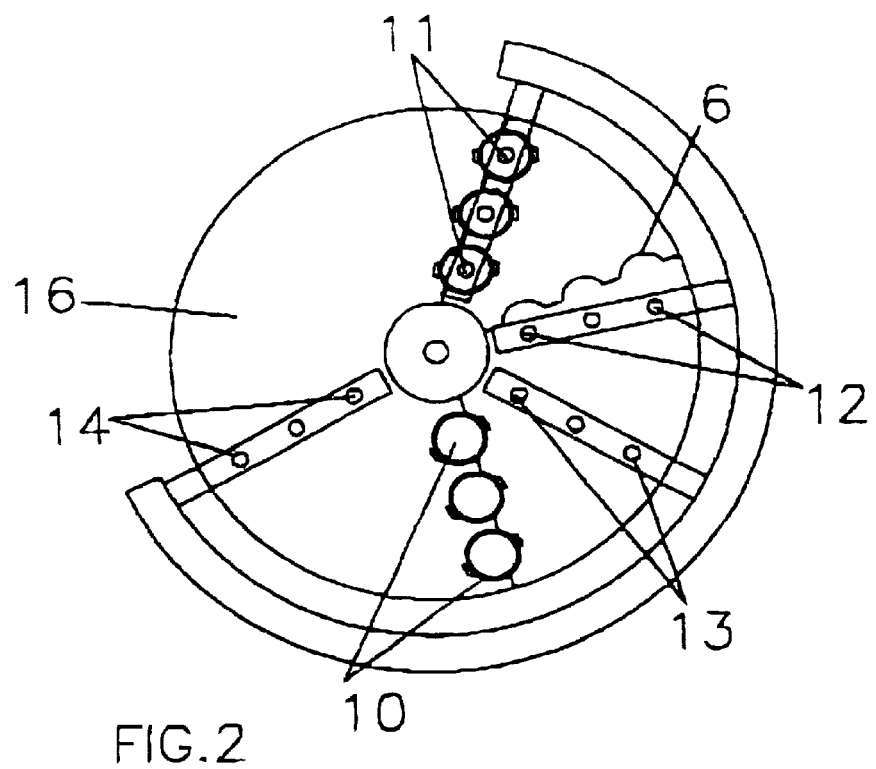
FIG. 2 shows a schematic view of a circular machine with a fixed base.
Figure 3:
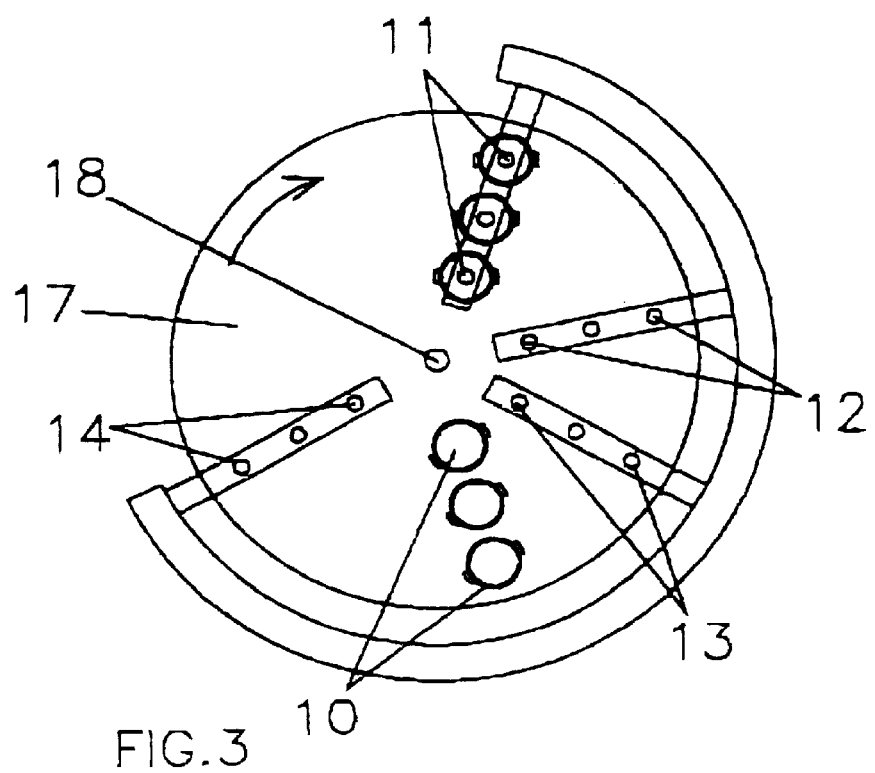
FIG. 3 shows a schematic view of a circular machine with a moving base.
Figure 4:
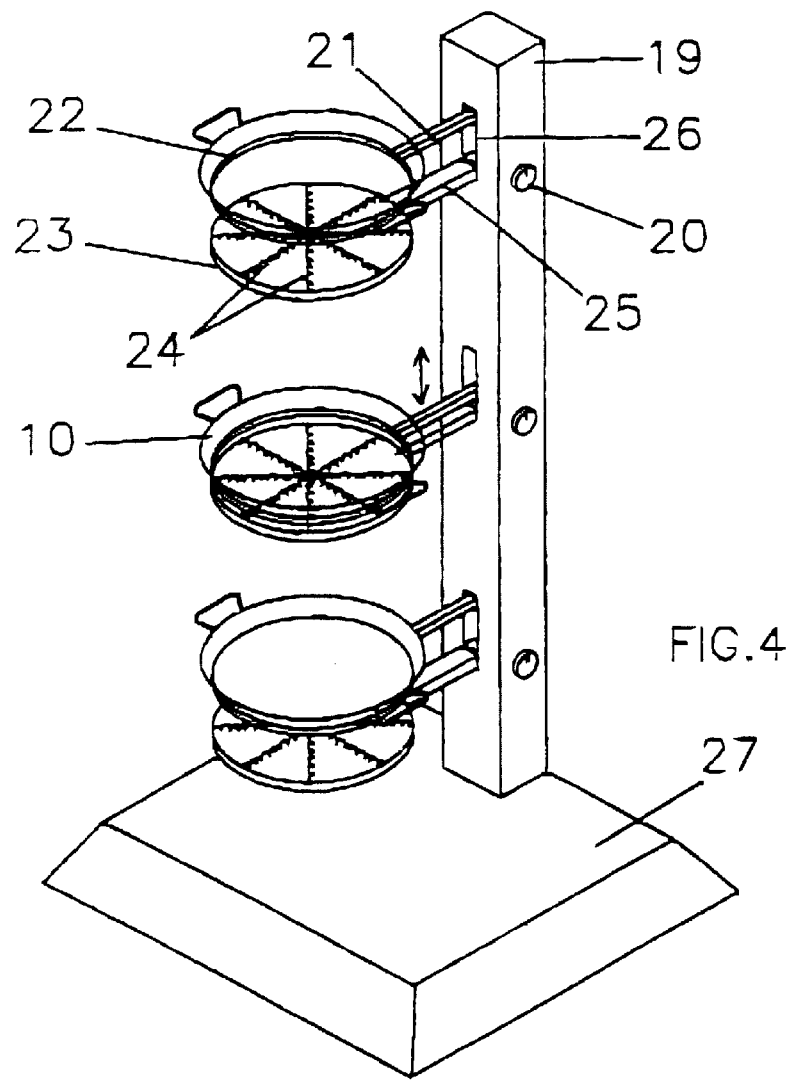
FIG. 4 shows a perspective view of a heating or cooking completion column for pre-cooked meals.
Figure 5:
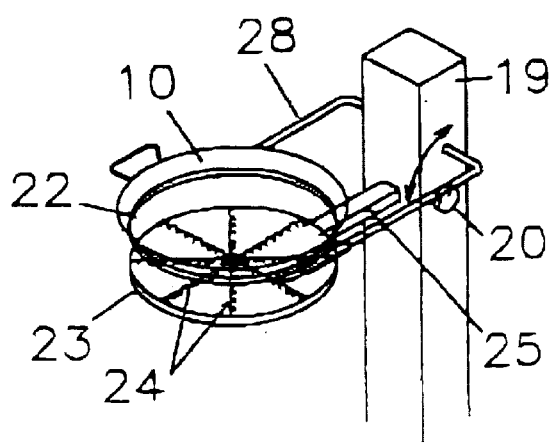
FIG. 5 shows a perspective view of the container holder on the heating column.
Figure 6:
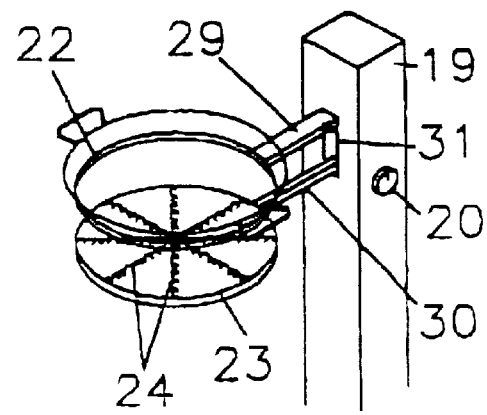
FIG. 6 shows a perspective view of a layout of the heating ring on the column.
Figure 7:
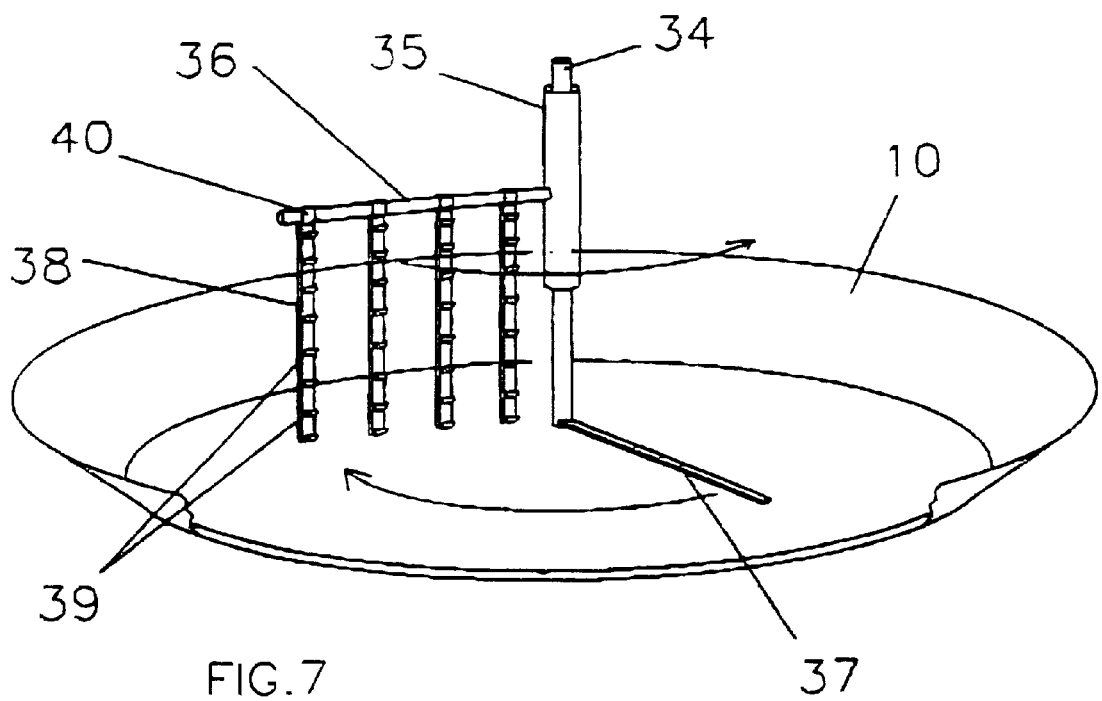
FIG. 7 shows a schematic view of the stirring device over the container.
Figure 8:
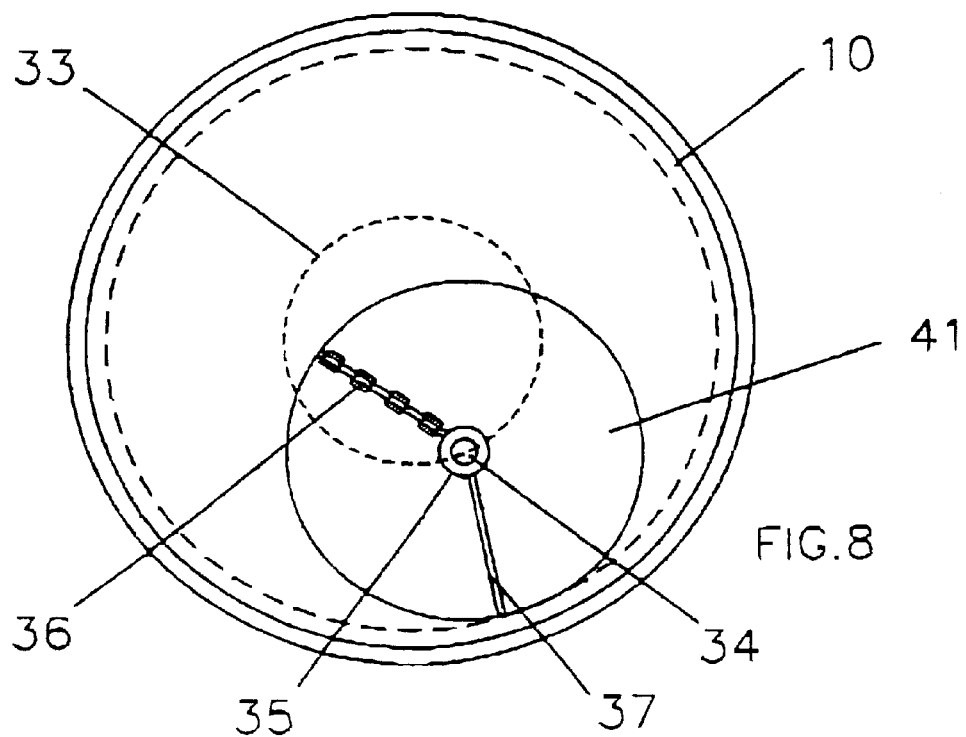
FIG. 8 shows a top view of the stirring action over the container according to a possible concentric movement or circular travel.
Figure 9:
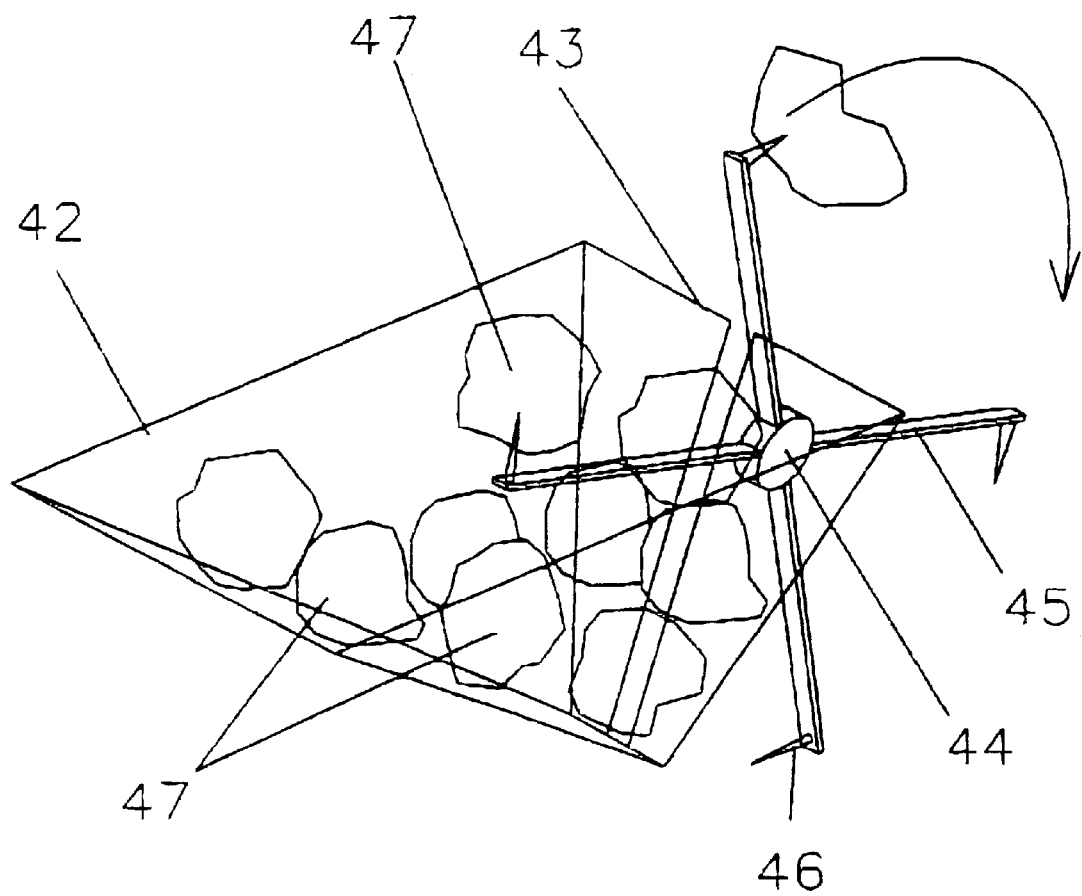
FIG. 9 shows a schematic view of the meat or fish feed formed of a hopper and a vane extractor.

In these figures 1 represents the frame of the linear machine, 2 being the rod conveyor belt or feed belt for moving the rods, 3 being the pulley wheel for said movement, 4 being the pulley wheel axle, 5 the return belt, 6 the pull rods for the containers which can have means to hook the container onto the rods, 7 the motor reduction unit, 8 the belt or chain for motor transmission, 9 being the table for supplying containers or automatic container supply devices, 10 being the containers themselves, 11 being the food I supply pipes, 12 the pipes for proportioning portions of food II, 13 the pipes for proportioning portions of food III, 14 the pipes for proportioning portions of food IV, 15 the outlet table or conveyor belt which take the containers of already cooked or semi-cooked food, 16 being the surface for providing the heat on the longitudinal machine and the fixed heating ring on the circular machine with rotating drive, 17 being the rotating ring in the rotating circular machine, 18 the rotating axis, 19 the heating column, 20 the timer for triggering off the distancing of the heating ring from the recipient, 21 the moving arm for holding the containers, 22 the container holding ring, 23 the heating ring, 24 the electrical resistance, 25 the fixed heating ring-holding arm, 26 being the lifting/lowering travel of the arm 21, 27 being the base of the heating columns, 28 the arms for holding the container according to the tilting embodiment of FIG. 5, 29 being the fixed container holding arm according to the embodiment of FIG. 6, with 30 being the arm for holding the moving heating ring, 31 being the lifting/lowering travel of the moving heating ring, 33 the range of travel of the stirring assembly, 34 being the axle of the blade 37, 35 the axle of the blade 36, 36 being the upper blade, 37 the lower blade, which travels across the bottom of the container, 38 being the tilting hanging strips held by blade, 36, 39 the hooks fitted on the hanging strips, 40 being the rings or bushes for securing the hanging strips to the blade 36 in a tilting sense, 41 being the area swept by the stirring device, 42 the feed hopper, 43 the wall with a slot for letting the vane through, 44 the axle of the vanes 45 fitted with a punch 46, 47 the pieces of meat or fish which are to be supplied by the turning vanes 45.

The drive rods 6 can where applicable be hooked onto the containers. The containers used can be of the disposable type or the traditional variety, recoverable for later use. Said containers should preferably be of the type that can be used in micro-wave ovens.

For overall understanding purposes, the cooking base is taken to be the oil, grease, fat or butter, vegetable mixes, in which the food is cooked. Semi-cooked is the term given to define an incomplete cooking process, which is broken off, and can be completed at another time. Cooked is the term for defining dull cooking until completion. The heating surface is one with resistances, heated by flames, radiation or other means which are transferred to the recipient. Hooked refers to any movable but firm securing device. Cooked dish is the practical embodiment of a meal. Food is any of the ingredients which form a dish. Lightly fried base is the term used to define the substrate formed by oil or fried-fats containing, for example, tomato purée, pepper, onion, etc.

The pre-cooked dishes are produced as follows: each of the recipients known in Valencia as "paellas", which have lent their name to the cooked content, is placed at the starting point on the corresponding machine. They can be automatically arranged by a suitable feed mechanism or manually set out. A detector verifies the position of the container at each ingredient insertion point, with each container being on an intense heat-providing surface throughout the process. After checking the starting position, the ingredient feeder places the oil inside, and then quickly adds the corresponding meat (chicken and rabbit) or fish, which is stirred up by automatic stirring device located over each container in the place corresponding to the cooking time, and thereafter the tomato and greens, then the pepper, the water, the colouring agent or saffron when the water boils, and then the rice or noodles.

The stirring devices 34–40 have the task of turning the meat or fish over in the initial cooking process, which is done only in oil. Since the problem that may arise is that the meat or fish sticks to the bottom of the container, the aforementioned stirring devices are fitted with two concentric contra-rotating axles 34 and 35, each being joined to a blade. The lower blade 37 sweeps the bottom of the container, preferably without touching this. The upper blade 36 has hanging strips 38 fitted with protuberances or hooks 39, that can pull the pieces of meat or fish 47 after these have been moved away from the bottom by the blade 37. Their advance motion can be concentric or in a circular movement over the bottom of the container.

At this point two alternatives are possible.

The first of these involves breaking off the boiling process half way through, and separating the stock from the other components at this point, with said components being left in the recipient, practically dry, and reserving the stock in a separate container at the same time. Both are properly sealed and cooled. Later on they are again combined at the right time to complete the cooking process in a few minutes.

The second alternative is that of total cooking. In this case, the cooking process is not interrupted, and after completion the dish is separated from the heat to be cooled and will later have to be heated up on proper means for consumption. It can be taken out of the containers and installed in a plastic containers, for example, for heating in a microwave oven.

Either of these embodiments allows the contents to be frozen, with the drop in quality that this entails.

The machine which carries out this process requires one space for inlet and another for the outlet of the containers, and according to said space, the machine can be linear or circular, without this modifying the objective conditions of its structure and function.

The advance motion of the containers is preferably uniform; stops can nevertheless be envisaged, with a consequently non-uniform advance, and resulting in a reduction in length of the machine.

In the case of the linear machine, there is an inlet for containers, and feeders of oil, tomato, purée, greens, vegetables, and all the ingredients. It would be suitable for said feeders to act only once for each container, meaning that in each position each feed always supplies the same product in the same quantities for each container. The advance motion of the containers along the machine is according to time; for this reason, when the distance travelled is complete, the dish is ready. The position for inserting ingredients thus depends on the total advance distance, on the total cooking time and on the particular individual times. The temperature of the heat-providing surface can be different in each stage according to the advance motion of the containers.

This essential arrangement can be made by means of a circular instead of a longitudinal machine.

Each machine's yield per time in dishes directly depends on the effective container-holding surface area that such machines have.

In the case of production by the interrupted process, the remaining cooking can be done by traditional means at each home; nevertheless, for industrial application the use of a timed heater is envisaged. This is the arrangement on a support fitted with a timer and joined to the heating machine and a separator, also timed, to distance the heat-providing surface. This type of heater entails the advantage that in high producing-rate situations, such as restaurants or house-to house delivery to order businesses, the container is placed on the heater and timed. After the time required elapses the heat-providing surface is separated from the container, being left close to this, so that apart from not continuing with cooking the container is kept hot, without this starting to cool quickly.

In any case, the basic procedure can have a cooling or freezing chain provided as a continuation or joined to this.

To sum up it should be stated that the protection afforded by this patent will specifically cover a method and corresponding machines for making pre-cooked and semi-pre-cooked dishes, characterised in that it consists of a series of operations based on providing the different ingredients, on the different cooking stages with pre-set times, development, adding ingredients, stirring times and obtaining the result, carried out on machines which undertake the semi-cooking and full cooking process in stages that are either alternating or continuous; in which the semi-cooking process consists of the operations of initially heating up each container, providing the cooking base with oil or similar fat and developing this, supplying the ingredients in accordance with the phases and corresponding times through the corresponding proportioners up to a partial cooking point; and in which the semi-cooked alternative involves interrupting the cooking process in the partial system, extracting the liquid from the corresponding solid part, with each portion, solid or liquid, being separated and properly preserved for future completion; and proceeding to cool and/or freeze the previously semi-cooked separated ingredients, the solid part in the recipient, and the liquid part in a suitable container.

Furthermore, in the continuous cooking operation, this works by means of continuous and uninterrupted semi-cooking and cooking operations in which the sequence for carrying out the whole process is done by automatically supplying or proportioning ingredients to form a dish which can then either be consumed or kept by cooling and/or freezing the finished food as this was cooked and placed in its container, all of this being done on a machine for cooking which consists of a machine strictly speaking formed of:

a heat-providing surface 16, 17, whose temperature is that of the heat-provided for cooking the relevant dish, a timed constant-speed drive-pulling system 6, along or over the aforementioned heat-providing surface, proportioners 11, 12, 13, and 14 of ingredients or food for each type of dish and proportioning nozzles for supplying the right ingredients for the particular dish positioned in the corresponding space/time.

A device for suction or extraction of the cooking liquid and storing this in a separate tank or container. This machine has stirring devices which drop over each container 10 at the proper time, turning the food over and distributing this as required and according to what stage of cooking this is in, with the containers being supplied by a supply table 8 and placed when completed on an outlet or finishing table 15, with a cooking process that can be performed in a longitudinal or circular direction.

On the circular machine the cooking process can be carried out through rotation of the heat supplying surface 17 which holds the containers.

The unit for finishing the cooking is made up of an assembly which holds at least one container 10, and is fitted with a mobile support arm 21 which has a timed 20 raising position for the container 10 from contact with an electrical resistance 23, 24 by means of which the cooking process is carried out, so that after the cooking time is over and the timer has triggered off, it is raised a few centimeters away from said resistance. This assembly can be formed of at least one set of securing arms 28 for at least one container 10 in respect of a support which has the container 10 lifting position timed in contact with an electrical resistance 23, 24 by means of which the cooking process is carried out, so that, after the cooking time is over and the time has triggered, it is moved a few centimeters away from said resistance. Said unit for completing the cooking can also be formed of an assembly which holds at least one container 10 on a support under which there is an electrical resistance held by an arm 30 by means of which the cooking process is carried out, so that when the cooking time is over and the timer triggers, said electrical resistance 23, 24 drops, the recipient being left at a distance of a few centimeters from said resistance.

This is for industrial application in making cooked and semi-cooked dishes.

What is claimed is:

1. A machine for preparation of food dishes in a cooking process, comprising:

a cooking unit including:

A heat-providing surface for cooking a corresponding food dish, a timed drive-pulling device for positioning a container over the heat-providing surface;

proportioners for supplying particular ingredients/food for each type of preparation of the food dish, and including proportioning and supply nozzles for supplying ingredients/food to a respective container for the food dish, and stirring devices that can drop over each container at a set time, for turning over and spreading out the ingredients/food in the respective container; and a finish unit.

2. A machine according to claim 1, further comprising a cooking liquid extraction device for extracting the cooking liquid form the food dish and for storing the extracted cooking liquid in a separate container.

3. A machine according to claim 1, wherein the finishing unit is securely joined to the cooking unit so that there is continuity between a semi-cooking process in the cooking unit and a final cooking process in the finishing unit.

4. A machine according to claim 1, further comprising:

an automatic supply table for feeding the containers to the heat-providing surface of the machine, and an outlet table for placing the containers after completion of a cooking operation.

5. A machine according to claim 1, wherein the machine carries out the cooking process in a longitudinal arrangement.

6. A machine according to claim 1, wherein the machine carries out the cooking process in a circular arrangement.

7. A machine according to claim 1, wherein the machine is circular and carries out the cooking process by rotating the heat-providing surface which holds the containers.

8. A machine according to claim 1, wherein the finishing unit includes at least one assembly which holds at least one container, each said assembly including:

a moving support arm for holding said a container, an electrical resistance held by the arm and by means of which cooking of the ingredients/food in the container is carried out, and a timed separation device including a timer, for separating the container from said electrical resistance after a set time so that, when the cooking time is over and the timer triggers off, the electrical resistance is positioned a few centimeters away from the container.

9. A machine according to claim 1, wherein the finishing unit comprises:

at least a pair of arms for holding at least one container in respect of a support, an electrical resistance held by said pair of arms for cooking the ingredients/food in the container, and a timed lifting device for the container in contact with the electric resistance, for separating the container by several centimeters from the electrical resistance after the cooking time has elapsed and the timer has triggered.

10. A machine according to claim 1, wherein the finishing unit comprises:

an assembly which holds at least one container in a support, the assembly including an arm, an electrical resistance held by the arm by means of which the cooking process is carried out, and a device for separating the container from the electrical resistance by a few centimeters when the cooking time is over and the timer has triggered off.

11. A machine according to claim 1, wherein the heat-providing surface provides different temperatures corresponding to different cooking stages.

12. A machine according to claim 1, wherein the containers are pulled along at a uniform rate.

13. A machine according to claim 1, wherein the containers are pulled along at a rate which is not uniform, with slow advances and/or stops during travel thereof.

14. A machine according to claim 1, wherein the stirring devices include a set of two blades, one blade being an upper horizontal blade turning in one direction and fitted with hanging strips which are tilting and held by the upper blade, with the hanging strips fitted with hooks, and the other blade being a lower blade rotating in an opposite direction in respect of the upper blade and traveling across a bottom of the container, both blades being joined to a part with a double vertical and concentric shaft.

15. A machine according to claim 14, wherein the stirring device shaft has a circular movement concentric to the container.

16. A machine according to claim 14, wherein the shaft of the stirring device has a circular displacement.

17. A machine according to claim 2, wherein one of the proportioners is a device for supplying pieces of meat or fish, and includes a hopper set out beside a rotating shaft fitted with at least one arm with a punch at its end, the hopper having a slot in one wall thereof so that rotation of said arm punches a single piece, which it takes out of said hopper to the proportioning and supply nozzles.

18. A machine according to claim 1, wherein the containers are hooked onto the timed drive-pulling device.

19. A machine according to claim 1, wherein said machine carries out the cooking of dishes formed by a substrate or lightly fried base, by successively:

partially cooking meat/fish and vegetables in this base, fully cooking said vegetables in a stock, and one of fully and partially cooking one of:
rice and
noodles.

* * * * *